(12) United States Patent
Maehata et al.

(10) Patent No.: US 9,703,754 B2
(45) Date of Patent: Jul. 11, 2017

(54) AUTOMATIC REMOTE MONITORING AND DIAGNOSIS SYSTEM

(75) Inventors: Noriyuki Maehata, Tokyo (JP); Shigehiko Matsuda, Tokyo (JP)

(73) Assignee: TOSHIBA MITSUBISHI-ELECTRIC INDUSTRIAL SYSTEMS CORPORATION, Tokyo (JP)

(*) Notice: Subject to any disclaimer, the term of this patent is extended or adjusted under 35 U.S.C. 154(b) by 926 days.

(21) Appl. No.: 13/819,491

(22) PCT Filed: Oct. 15, 2010

(86) PCT No.: PCT/JP2010/068179
§ 371 (c)(1),
(2), (4) Date: Feb. 27, 2013

(87) PCT Pub. No.: WO2012/049771
PCT Pub. Date: Apr. 19, 2012

(65) Prior Publication Data
US 2013/0185022 A1    Jul. 18, 2013

(51) Int. Cl.
*G05B 23/02* (2006.01)
*H04M 3/51* (2006.01)
*G06F 17/00* (2006.01)

(52) U.S. Cl.
CPC ......... *G06F 17/00* (2013.01); *G05B 23/0275* (2013.01); *H04M 3/5166* (2013.01); *G05B 2219/13* (2013.01); *G06F 2213/0038* (2013.01)

(58) Field of Classification Search
CPC .... G05B 23/00; G05B 23/02; G05B 23/0205; G05B 23/0275

(Continued)

(56) References Cited

U.S. PATENT DOCUMENTS 6,297,742 B1 * 10/2001 Canada ................ G01R 31/343
                                                                318/490
6,594,621 B1 *  7/2003 Meeker .............. G05B 23/0283
                                                                702/183

(Continued)

FOREIGN PATENT DOCUMENTS

| JP | 5-73319 A   | 3/1993  |
| JP | 2002 62252  | 2/2002  |
| JP | 2002 207837 | 7/2002  |
| JP | 2003 324544 | 11/2003 |
| JP | 2004 157087 | 6/2004  |

(Continued)

OTHER PUBLICATIONS

Office Action issued Sep. 3, 2013 in Taiwanese Application No. 100100905.

(Continued)

*Primary Examiner* — Bryan Bui
(74) *Attorney, Agent, or Firm* — Oblon, McClelland, Maier & Neustadt, L.L.P.

(57) ABSTRACT

An automatic remote monitoring and diagnosis system includes an environmental sensor and a physical sensor which measure environmental data and physical data, respectively, on electronic control devices and send the data by wireless communication, a wireless server which collects the measurement data of the sensors, a diagnostic client connected to the wireless server by a first communication network and that collects the measurement data from the wireless server, a diagnostic server connected to the diagnostic client by a second communication network and that carries out a diagnosis based on the measurement data from the diagnostic client, a data retaining device which retains the measurement data, and a knowledge database which stores information necessary for the diagnosis. The diagnostic server sends results of the diagnosis and a remedy to the diagnostic client via the second communication network.

20 Claims, 5 Drawing Sheets

(58) Field of Classification Search
USPC .......................................................... 702/188
See application file for complete search history.

(56) References Cited

U.S. PATENT DOCUMENTS

| | | | |
|---|---|---|---|
| 7,130,757 B2* | 10/2006 | Corwin | G08C 17/00 702/127 |
| 2002/0116157 A1* | 8/2002 | Markle | H04L 41/0213 702/188 |
| 2002/0120426 A1 | 8/2002 | Sasaki et al. | |
| 2004/0044914 A1* | 3/2004 | Gedeon | G06F 1/3203 713/300 |
| 2007/0043533 A1 | 2/2007 | Wiles et al. | |
| 2011/0057812 A1* | 3/2011 | Matsuda | G05B 19/406 340/870.07 |

FOREIGN PATENT DOCUMENTS

| | | |
|---|---|---|
| JP | 2005 223497 | 8/2005 |
| JP | 2010-218056 A | 9/2010 |
| WO | 2009 144820 | 12/2009 |

OTHER PUBLICATIONS

International Preliminary Report on Patentability and Written Opinion issued May 16, 2013 in PCT/JP2010/068179 filed on Oct. 15, 2010 (English translation).

Office Action issued on Mar. 11, 2014 in the corresponding Japanese Patent Application No. 2012-538540.

International Search Report Issued Nov. 9, 2010 in PCT/JP10/68179 Filed Oct. 15, 2010.

* cited by examiner

AUTOMATIC REMOTE MONITORING AND DIAGNOSIS SYSTEM

TECHNICAL FIELD

The present invention relates to an automatic remote monitoring and diagnosis system.

BACKGROUND ART

For example, electronic control devices for plant equipment or equipment of plants and the like (hereinafter referred to as "electronic control devices and the like") are affected by the installation environment during the use thereof and troubles and abnormalities may sometimes occur. Therefore, it becomes necessary to carry out an investigation of the installation environment of electronic control devices and the like. In general, this investigation of the installation environment has hitherto been performed at some specific point of time, for example, before the delivery of equipment including electronic control devices, during the installation of equipment, at periodical inspection of equipment, and in the case where some inconvenience occurred unexpectedly in electronic control devices and the like. The measuring period of various kinds of data in this investigation is a short period of at most several weeks or so. That is, the measurement of data is sporadic, and the monitoring and diagnosis of abnormalities are not continuously performed for a long period of time.

Furthermore, in conventional measurements of data, first, workers including contractors who contracted to take the measurements set measuring equipment, such as a thermometer, a hygrometer, an accelerometer, a gas concentration meter, a voltmeter, an ammeter, and an electromagnetic wave meter, at the site. Next, after the measurements for a fixed period the workers revisit the site to retrieve the measurement data. In general, a series of steps of analyzing the retrieved measurement data, compiling a report, and submitting the report to a client, are carried out. Therefore, the investigation of the installation environment has the problem that the measurement, collection, analysis and reporting of data require much labor and expense.

Incidentally, in conventional data measurement, in the above-described series of steps, the measurement and collection of data are sometimes automatically performed. However, the preparation of a report based on an analysis of data and results of the analysis are not automatically performed. For this reason, it is necessary for the workers to retrieve the collected data, to perform the analysis and the preparation of a report, and these works require much labor and expense in the same manner as described above.

Therefore, there are known conventional systems in which to solve such problems, for example, a diagnosis of life and degree of deterioration by the corrosion of metallic areas of equipment of a plant and the like, is performed using environmental information (refer to Patent Literature 1, for example). In the system described in Patent Literature 1, among the above-described various kinds of measurement data in the investigation of the installation environment, only what is called environmental data, such as temperature, humidity, and concentrations of corrosive gasses, is measured. And the measured environmental data is inputted to a diagnostic client. The diagnostic client sends the environmental data to a diagnostic server. The sending of the environmental data is performed via the Internet. The diagnostic server estimates the life and degree of deterioration of equipment based on the environmental data while referring to the information accumulated in a diagnostic database, and presents results of the estimation and a remedy to the diagnostic client.

Furthermore, there are also known systems in which the object of monitoring is an electronic control panel for plant equipment and the soundness of the environment in the control panel is monitored (refer to Patent Literature 2, for example). In the system described in Patent Literature 2, environmental sensors which measure the installation environment of various kinds of equipment in the control panel and physical sensors which measure physical quantities of various kinds of equipment in the control panel are provided in the control panel. And measurement data by these sensors are sent to a monitoring device (a computer system) by wireless communication outside of the control panel. This monitoring device is provided with an algorithm which monitors the soundness of the environment of the control panel from the correlation between changes in measurement data and a knowledge database related to an environmental standard stored beforehand. And when abnormality occurred, the place of occurrence and cause of the abnormality are estimated and the contents of countermeasures and support are outputted to a screen of the monitoring device.

CITATION LIST

Patent Literature

Patent Literature 1: Japanese Patent Laid-Open No. 2002-062252
Patent Literature 2: International Publication No. WO2009/144820

SUMMARY OF INVENTION

Technical Problem

In the system described in Patent Literature 1, only the environmental data having an indirect effect on the operation of the electronic control devices and the like is measured and physical data having a direct effect on the operation of the electronic control device and the like, such as voltage, current, electromagnetic wave, and static electricity, is not measured. Therefore, a judgment is made on the state of the environmental atmosphere in which equipment is placed, and indirectly from the state of this environmental atmosphere, it is possible to estimate whether the situation is such that an abnormality can occur in the electronic control devices and the like. However, it is impossible to directly judge that an abnormality has occurred in the electronic control devices and the like and to investigate the cause of the abnormality occurred in the electronic control devices and the like. For this reason, this system has the problem that it is impossible to present accurate remedies for solving problems.

In the system described in Patent Literature 2, measurement data from sensor groups is sent to a monitoring device by wireless communication. Here, in wireless communication, communicatable distances, the number of connections and the like are limited. For this reason, in the case where the scale of a plant, factory and the like to be monitored is large and in the case where a plurality of remote places are to be monitored, it is impossible to monitor all of the objects of monitoring with one monitoring device alone. Therefore, in the case where a plurality of monitoring devices are used according to the scale of the objects of monitoring and the like, this system has the problem that the efficiency is low because data cannot be collectively managed, and the problem that measurement data cannot be referred to from locations other than the monitoring device in which the measurement data are retained.

On the other hand, the system described in Patent Literature 1 is predicated on sharing the data on diagnosis results in a plurality of objects of monitoring among a plurality of diagnosis requesters. For this reason, a diagnostic client and a diagnostic server are connected via the Internet and the configuration is such that measurement data is always sent via the Internet. Therefore, this system has the problem that, for example, in the case where a measurement requester does not want the measurement data to be disclosed to others, and in the case where rigid security is required, it is impossible to build a closed system within the company of the measurement requester and the like.

That is, the systems described in Patent Literature 1 and Patent Literature 2 both have the problem that it is impossible to flexibly build a monitoring and diagnosis system according to the situation, state and the like of an object of monitoring, a diagnosis requester and the like.

The present invention is made to solve such problems as described above and the invention provides an automatic remote monitoring and diagnosis system which continuously performs automatic measurement and automatic collection of environmental data and physical data related to electronic control devices and the like, diagnoses the existence or nonexistence of an abnormality in the electronic control devices and the like by analyzing the collected data in real time, can automatically present results of the analysis and diagnosis and, as required, a remedy, and which can be flexibly built according to the situation, state and the like of an object of monitoring, a diagnosis requester and the like.

Means for Solving the Problems

An automatic remote monitoring and diagnosis system according to the present invention, which diagnoses electronic control devices or equipment, comprises: an environmental sensor which measures environmental data related to an installation environment of the electronic control devices or equipment with a prescribed measurement cycle and sends measurement data by wireless communication; a physical sensor which measures physical data related to the electronic control devices or equipment with a prescribed measurement cycle and sends measurement data by wireless communication; a wireless server which collects the measurement data sent from the environmental sensor and the physical sensor by wireless communication and sends the collected measurement data at prescribed time intervals; a diagnostic client which is communicatably connected to the wireless server by a first communication network, collects the measurement data sent from the wireless server via the first communication network, and sends the collected measurement data at prescribed time intervals; a diagnostic server which is communicatably connected to the diagnostic client by a second communication network, receives the measurement data sent from the diagnostic client via the second communication network, and carries out a diagnosis of the electronic control devices or equipment based on the received measurement data; a data retaining device which retains the measurement data received by the diagnostic server; and a knowledge database which stores information necessary when the diagnostic server carries out the diagnosis, wherein the diagnostic server sends results of the diagnosis to the diagnostic client via the second communication network and in the case where as a result of the diagnosis there is a problem in the electronic control devices or equipment, the diagnostic server determines a remedy for the problem and sends the remedy to the diagnostic client via the second communication network.

Advantageous Effects of Invention

In the automatic remote monitoring and diagnosis system of the present invention, automatic measurement and automatic collection of environmental data and physical data related to electronic control devices and the like are continuously performed, the existence or nonexistence of an abnormality in the electronic control devices and the like is diagnosed by analyzing the collected data in real time, the automatic remote monitoring and diagnosis system has an effect that it is possible to automatically present results of the analysis and diagnosis and, as required, a remedy, and to be flexibly built according to the situation, state and the like of an object of monitoring, a diagnosis requester and the like.

DESCRIPTION OF EMBODIMENTS

The present invention will be described with reference to the accompanying drawings. In each of the drawings, like numerals refer to like or corresponding parts and overlaps of description of these parts are appropriately simplified or omitted.

Embodiment 1

Figure 1:
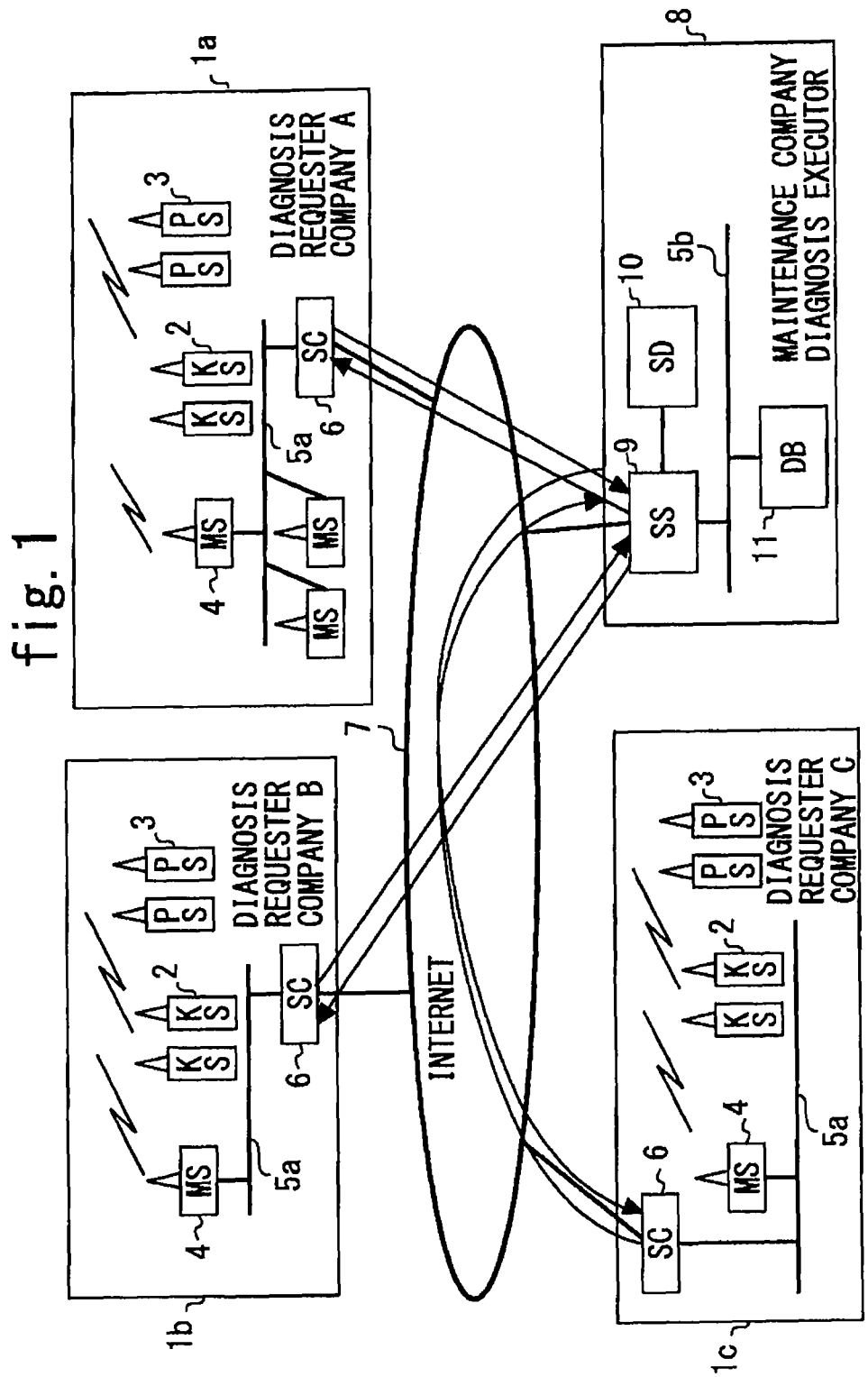
FIG. 1 is a diagram to explain the general configuration of an automatic remote monitoring and diagnosis system related to Embodiment 1 of the present invention.

FIG. 1 is related to Embodiment 1 of the present invention. FIG. 1 shows the general configuration of an automatic remote monitoring and diagnosis system. In FIG. 1, reference numerals 1*a*, 1*b*, and 1*c* denote Company A, Company B, and Company C, respectively, which are diagnosis requesters for the state of electronic control devices and the like. Although in this case the number of diagnosis requesters is 3, any number is allowed. Company A 1*a*, Company B 1*b*, and Company C 1*c* are provided with electronic control devices and the like (not shown) which are the objects of monitoring and diagnosis of the automatic remote monitoring and diagnosis system of the present application invention. And environmental sensors 2 and physical sensors 3 are installed within cabinets of the electronic control devices and the like of these diagnosis requesters and in the vicinity of the electronic control devices and the like.

The environmental sensors 2 are sensor groups each consisting of a plurality of sensors which measure environmental data, such as temperature, humidity, vibration (acceleration), and concentrations of corrosive gasses. The environmental sensors 2 consisting of such sensor groups have the function of measuring each measurement element with a prescribed measurement cycle, which is determined for each measurement element, and of sending the measured data by wireless communication.

Temperature, humidity, and corrosive gasses among the measurement elements related to the environmental data which are the objects of measurement by the environmental sensors 2 do not change drastically in a short time. Therefore, the measurement cycle of these elements may be on the order of, for example, 1 minute, 10 minutes or 30 minutes. On the other hand, it is thoroughly possible that vibration (acceleration) changes instantaneously. Therefore, measurements at short time intervals are necessary, and from the experience of the present application inventors, measurement cycles of 10 milliseconds or so are desirable.

The configuration of sensors constituting the environmental sensors 2 will be described in detail. A semiconductor integrated type can be used as a sensor part which measures the elements, such as temperature, humidity, and vibration (acceleration) among the measurement elements of the above-described environmental data. This sensor part of the semiconductor integrated type is generally in wide use and can be easily obtained. And by combining a wireless communication device, which will be described later, an MPU (micro processing unit), and a memory in this sensor part, it is possible to easily form a compact sensor which can be installed in the interior of the electronic control devices and the like.

For the concentrations of corrosive gasses, a gas sensor which outputs measurement results as electrical signals of voltage, current and the like is used in the sensor part and a sensor capable of loading the electrical signals is formed in the same manner as with the sensors measuring temperature and humidity described above, whereby it is possible to easily realize a compact sensor. Incidentally, gas sensors which output measurement results as electrical signals of voltage, current and the like are available as the semiconductor type, the solid electrolyte type, the electrochemical type and the like, and gas sensors of any type can be used.

The physical sensors 3 are sensor groups each consisting of a plurality of sensors which measure physical data, such as voltage, current, electromagnetic wave, and static electricity. As with the environmental sensors 2, also the physical sensors 3 consisting of such sensor groups have the function of measuring each measurement element with a prescribed measurement cycle, which is determined for each measurement element, and of sending the measured data at predetermined time intervals by wireless communication.

Voltage and current among the measurement elements related to the physical data which are the objects of measurement by the physical sensors 3 change in very short time intervals. For example, it is empirically evident that when static electricity is applied, great changes are observed in voltage and current. And in order to grasp such great changes in voltage and current, it is necessary to take measurements at intervals of at least 10 nanoseconds. On the other hand, for variations in voltage of control power supply and variations in current consumption in the steady state of the electronic control devices and the like, the need that measurements be made at relatively long time intervals of the order of approximately 10 milliseconds exists.

Therefore, in order to meet both of these requirements, for sensors which measure voltage and current, two kinds of sensors may be installed: a sensor having a relatively long measurement cycle of the order of 10 milliseconds and a sensor having a very short measurement cycles of the order of 10 nanoseconds. In contrast to this, for electromagnetic wave and static electricity, it is empirically evident that changes occur with very fast frequencies. Therefore, it is desirable that the measurement cycle for these elements be on the order of 10 nanoseconds.

The configuration of sensors constituting the physical sensors 3 will be described in detail. For the measurement elements related to the physical data enumerated above, sensor parts which measure these elements called probes are widely in commercial use. These probes output measurement results of each measurement element as electrical signals. Therefore, by combining a portion which receives electrical signals outputted from the probes, a wireless communication device, which will be described later, an MPU (micro processing unit), and a memory in these probes, it is possible to easily form a compact sensor which can be installed in the interior of the electronic control devices and the like.

In the companies of the diagnosis requesters (Company A 1a, Company B 1b, and Company C 1c), a wireless server 4 is installed which collects the measurement data sent from these environmental sensors 2 and physical sensors 3 by wireless communication. This wireless server 4 is arranged within approximately 10 meters from environmental sensors 2 and physical sensors 3. The wireless server 4 is provided in multiple numbers as required according to the installed number, installed places and the like of the environmental sensors 2 and physical sensors 3.

As the method of wireless communication among the environmental sensors 2, the physical sensors 3, and a wireless server 4, for example, standardized methods, such as specified energy saving radio and IEEE802.15, are used. For the wireless communication standard mentioned here, an infrastructure, such as a compact communication module, is already in commercial use. For this reason, it is possible to downsize individual sensors used in the environmental sensors 2 and the physical sensors 3, and at the same time, it is possible to realize high communication quality without requiring new technology development.

A first LAN 5a as an in-house communication network is respectively laid in each of the diagnosis requesters (Company A 1a, Company B 1b, and Company C 1c). And the wireless server 4 is connected to this first LAN 5a. This wireless server 4 has the function of sending the measurement data collected from the environmental sensors 2 and the physical sensors 3 to the first LAN 5a at predetermined time intervals.

A diagnostic client 6 is respectively installed in each of the diagnosis requesters (Company A 1a, Company B 1b, and Company C 1c). The diagnostic client 6 is connected to the first LAN 5a of each of the diagnostic requesters. And the diagnostic client 6 collects the measurement data sent from one or a plurality of wireless servers 4 via the first LAN 5a.

Each of the diagnosis requesters (1a, 1b, and 1c) is communicatably connected to a maintenance company 8 via the Internet 7. The maintenance company 8 is a diagnosis executor which performs the monitoring and diagnosis of the electronic control devices and the like of each of the diagnosis requesters. And the diagnostic client 6 of each of the diagnosis requesters (1a, 1b, and 1c) is connected also to the Internet 7, which is an external network for each of the diagnosis requesters. Moreover, a diagnostic server 9 is installed in the maintenance company 8, and also this diagnostic server 9 is connected to the Internet 7.

The diagnostic client 6 of each of the diagnosis requesters (1a, 1b, and 1c) sends collected measurement data to the diagnostic server 9 of the maintenance company 8 via the Internet 7 at predetermined time intervals. The diagnostic server 9 receives the measurement data of the environmental sensors 2 and the physical sensors 3 sent from the diagnostic client 6 via the Internet 7.

Upon receipt of the measurement data, the diagnostic server 9 retains the received measurement data in a data retaining device 10 and diagnoses the object by analyzing the received measurement data. Also, the diagnostic server 9 prepares a report on the diagnosis results and, in the case where there is a problem, the diagnostic server 9 determines a remedy for the problem. And the diagnostic server 9 sends this report on the diagnosis results and the remedy to the diagnostic client 6 via the Internet 7 at predetermined time intervals or each time the report and the remedy are required by the diagnostic client 6.

A knowledge database 11 which is communicatably connected to the diagnostic server 9 by a second LAN 5b laid in the maintenance company 8 is installed in the maintenance company 8. An inference engine, diagnostic algorithm and trouble correlation data necessary for the analysis and diagnosis of an object by the diagnostic server 9 are stored in this knowledge database 11. The above-described analysis and diagnosis by the diagnostic server 9 based on the measurement data of the environmental sensors 2 and the physical sensors 3 are performed by referring to the contents of this knowledge database 11. The diagnostic server 9 updates the contents of the knowledge database 11 as required.

This diagnosis by the diagnostic server 9 is performed as follow. A threshold value is set beforehand in the diagnostic server 9 for each measurement element of the environmental sensors 2 and the physical sensors 3. And by comparing the measurement data with this threshold value, a judgment is made as to whether or not these data is abnormal. Furthermore, based on the temperature, humidity, and concentrations of corrosive gasses measured by the environmental sensors 2, the degree of environmental pollution and the degree of metal corrosion are estimated, for example, by well-known methods as described in Patent Literature 1, whereby the life of metal areas is predicted. In addition, a deterioration diagnosis of the electronic control devices and the like is carried out using the inference engine, diagnostic algorithm and trouble correlation data in the knowledge database 11 as well as the environmental data and physical data measured by the environmental sensors 2 and the physical sensors 3. The inference engine and diagnostic algorithm can be configured from known matters as described in Patent Literature 2, for example. That is, any method of realization, such as an independent logic group, an independent inference engine, a direct execution expression on an algorithm and the like, may be employed.

Incidentally, it is possible to build the first LAN 5a of each of the diagnosis requesters (1a, 1b, and 1c) and the second LAN 5b of the maintenance company 8, and the Internet 7 by general-purpose techniques.

The environmental measurement and environmental diagnosis of the electronic control devices and the like as the objects, in the automatic remote monitoring and diagnosis system of the present application invention are performed as follows.

First the environmental sensors 2 and the physical sensors 3 are installed in the electronic control devices and the like as the objects, and the wireless server 4 and the diagnostic client 6 are installed according to the scale of the objects. The diagnostic server 9 and the knowledge database 11 are installed in the maintenance company 8, and the diagnostic client 6 and the diagnostic server 9 are connected via the Internet 7. When the installation of each piece of equipment constituting the system in this manner is completed, switches of the environmental sensors 2 and the physical sensors 3 are turned on.

Then, the environmental sensors 2 and the physical sensors 3 measure each measurement element with the above-described prescribed measurement cycles, and send measured data to the wireless server 4 at prescribed time intervals by wireless communication. The wireless server 4 collects the measurement data sent from these environmental sensors 2 and the physical sensors 3, and sends the collected measurement data to the diagnostic client 6 at prescribed time intervals via the first LAN 5a. The diagnostic client 6 collects the measurement data sent from the wireless server 4 via the first LAN 5a, and sends the collected measurement data to the diagnostic server 9 of the maintenance company 8 at prescribed time intervals via the Internet 7.

The diagnostic server 9 receives the measurement data sent from the diagnostic client 6 via the Internet 7, and retains the measurement data in the data retaining device 10. Based on the received measurement data of the environmental sensors 2 and the physical sensors 3, the diagnostic server 9 carries out the diagnosis of the electronic control devices and the like of each of the diagnosis requesters (Company A 1a, Company B 1b, and Company C 1c) while referring to the knowledge database 11. And the diagnostic server 9 prepares a report on diagnosis results, and in the case where a problem is found as a result of the diagnosis, the diagnostic server 9 determines a remedy for the problem.

Furthermore, the diagnostic server 9 sends this report on the diagnosis results and the remedy to the diagnostic client 6 via the Internet 7 at predetermined time intervals or each time the report and the remedy are required by the diagnostic client 6. The diagnostic client 6 is provided with a display and an output device such as a printer, and the diagnostic client 6 presents the report on the diagnosis results and the remedy sent from the diagnostic server 9 via the Internet 7 to users via this output device.

In such an automatic remote monitoring and diagnosis system, the installation and setting of various kinds of equipment such as sensors, servers, and clients are carried out by workers as before. However, once the installation is completed and measurement is started, thereafter all of a series of steps of data measurement, input of measurement data, retaining, diagnosis, analysis, preparation of a report, and determination of a remedy are automatically carried out without requiring manpower. Furthermore, because the report on diagnosis results and measurement data are prepared and retained in the form of electronic data, this contributes greatly to the reduction of labor and expense, which have posed a problem in conventional environmental diagnoses. Moreover, because all are carried out automatically, it becomes possible to perform a diagnosis in real time.

And moreover, in the automatic remote monitoring and diagnosis system described above, measurement, data sending, and diagnosis are constantly carried out and a constant monitoring state is realized. For this reason, also for various problems which occur unexpectedly or sporadically in the electronic control devices and the like to be monitored, it is possible to retain and analyze the measurement data during the occurrence of such problems, and it is possible to identify the causes and to present remedies. In addition, because automatic measurements and automatic diagnoses can be continued for a long period, for example, for 5 years and 10 years, the automatic remote monitoring and diagnosis system of the present invention provides the advantage that it is possible to identify not only problems occurring instantaneously in the electronic control devices and the like, but also environmental factors which have an effect for medium and long periods.

The functions of the automatic remote monitoring and diagnosis system described above are provided to users in the manner described below. That is, this system is configured using IT technologies such as wireless communication, the Internet, and the server-client method. Therefore, it is possible to provide various services using such IT technologies. For example, the following are conceivable as the maintenance services which the automatic remote monitoring and diagnosis system of the present application invention can provide to users. A diagnosis requester who is a user selects services required by the requester himself from the following services and pays a compensation for the services to a diagnosis executor, whereby business is realized.

Saving environmental data

Carrying out an environmental diagnosis and preparing a report on the environmental diagnosis Presenting a remedy based on a report on the environmental diagnosis Identifying the cause when an unexpected or sporadic problem occurs and presenting a remedy for the problem in question Carrying out a deterioration diagnosis and preparing a report on the deterioration diagnosis Presenting a remedy based on a report on the deterioration diagnosis Presenting maintenance measures Incidentally, equipment constituting the automatic remote monitoring and diagnosis system described above, such as sensors, clients, and servers, may be installed beforehand in shipping new electronic control devices and the like or may be installed afterward in the electronic control devices and the like which have already been operating.

The automatic remote monitoring and diagnosis system configured as described above is provided with an environmental sensor which measures environmental data related to the installation environment of electronic control devices and the like with a prescribed measurement cycle and sends measurement data by wireless communication; a physical sensor which measures physical data related to electronic control devices and the like with a prescribed measurement cycle and sends measurement data by wireless communication; a wireless server which collects the measurement data sent from the environmental sensor and the physical sensor by wireless communication and sends the collected measurement data at prescribed time intervals; a diagnostic client which is communicatably connected to the wireless server by a first LAN, which is a first communication network, collects the measurement data sent from the wireless server via the first LAN, and sends the collected measurement data at prescribed time intervals; a diagnostic server which is communicatably connected to the diagnostic client by the Internet, which is a second communication network, receives the measurement data sent from the diagnostic client via the Internet, and carries out a diagnosis of the electronic control devices and the like based on the received measurement data; a data retaining device which retains the measurement data received by the diagnostic server; and a knowledge database which stores information necessary when the diagnostic server carries out the diagnosis. In this automatic remote monitoring and diagnosis system, the diagnostic server sends results of the diagnosis to the diagnostic client via the second communication network and, in the case where as a result of the diagnosis there is a problem in the electronic control devices and the like, the diagnostic server determines a remedy for the problem and sends the remedy to the diagnostic client via the second communication network.

For this reason, it is possible to continuously perform the automatic measurement and automatic collection of the environmental data and physical data related to electronic control devices and the like, to analyze the collected data in real time, to perform a diagnosis as to the existence or nonexistence of an abnormality in the electronic control devices and the like, and to automatically present results of the analysis and diagnosis as well as a remedy as required. At the same time, it is possible to flexibly build the automatic remote monitoring and diagnosis system according to the situation, state and the like of the object of monitoring and the diagnosis requester.

Embodiment 2

Figure 2:
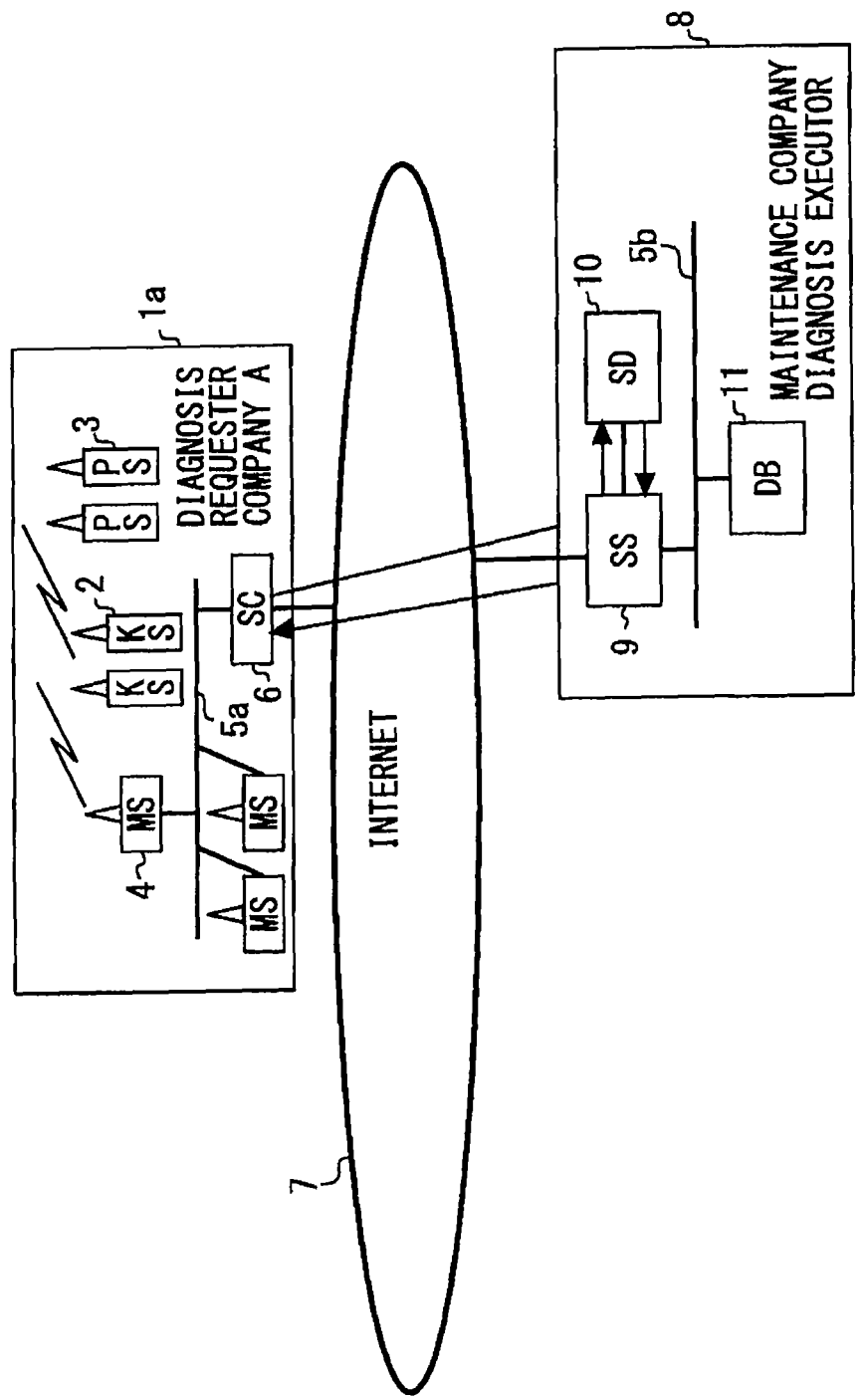
FIG. 2 is a diagram to explain the general configuration of an automatic remote monitoring and diagnosis system related to Embodiment 2 of the present invention.

FIG. 2 is related to Embodiment 2 of the present invention and is a diagram explaining the general configuration of an automatic remote monitoring and diagnosis system.

Embodiment 2 described here is obtained by paying attention, in particular, to saving and providing measured environmental data in Embodiment 1 described above.

That is, in the automatic remote monitoring and diagnosis system of the present application invention described in Embodiment 1, as shown in FIG. 2, the diagnostic client 6 and the diagnostic server 9 are communicatably connected by the Internet 7. Therefore, it is possible to continuously send measurement data from the diagnostic client 6 to the diagnostic server 9 at prescribed time intervals. And for this reason, it is possible to continuously retain measurement data from the start of data measurement up to the present time in the data retaining device 10 on the diagnostic server 9 side.

Company A 1*a*, which is a measurement and diagnosis requester, operates the diagnostic client 6 of Company A 1*a*, and sends a request in which necessary environmental data items and period are specified to the diagnostic server 9. Upon receipt of this request, the diagnostic server 9 extracts the specified data from the data retaining device 10 based on the contents of the request, and sends the data to the diagnostic client 6 from which the request has been made via the Internet 7. And the diagnostic client 6 indicates the environmental data sent from the diagnostic server 9 using an output device.

Incidentally, here, it is necessary to consider also the secrecy and security of the contents of communication because the communication between the diagnostic client 6 and the diagnostic server 9 is carried out using the Internet 7. Therefore, for the communication between the diagnostic client 6 and the diagnostic server 9, authentication may be performed using IDs and passwords and information may be encrypted using encryption technology, such as SSL.

And the diagnostic server 9 may have the function of bringing data together in any prescribed period as a daily report, a monthly report, and an annual report, and the function of outputting these brought-together data as an electronic file.

Other components are the same as in Embodiment 1, and detailed descriptions thereof are omitted.

The automatic remote monitoring and diagnosis system configured as described above has the effect that it is unnecessary for the diagnosis requester to carry out the measurement work which requires manpower and besides that the work of saving data is unnecessary. In addition, the automatic remote monitoring and diagnosis system has the effect that the diagnostic requester can obtain environmental measurement data in any period as required by operating the diagnostic client. Furthermore, the diagnostic server has the function of bringing data together in any prescribed period as a daily report, a monthly report, and an annual report and these brought-together data is outputted as an electronic file, whereby maintenance data can be provided to the diagnosis requester. And as a result of this, the automatic remote monitoring and diagnosis system has the effect that the environmental diagnosis requester can easily manage measurement work and measurement data and avoid the troublesome saving.

Embodiment 3

Figure 3:
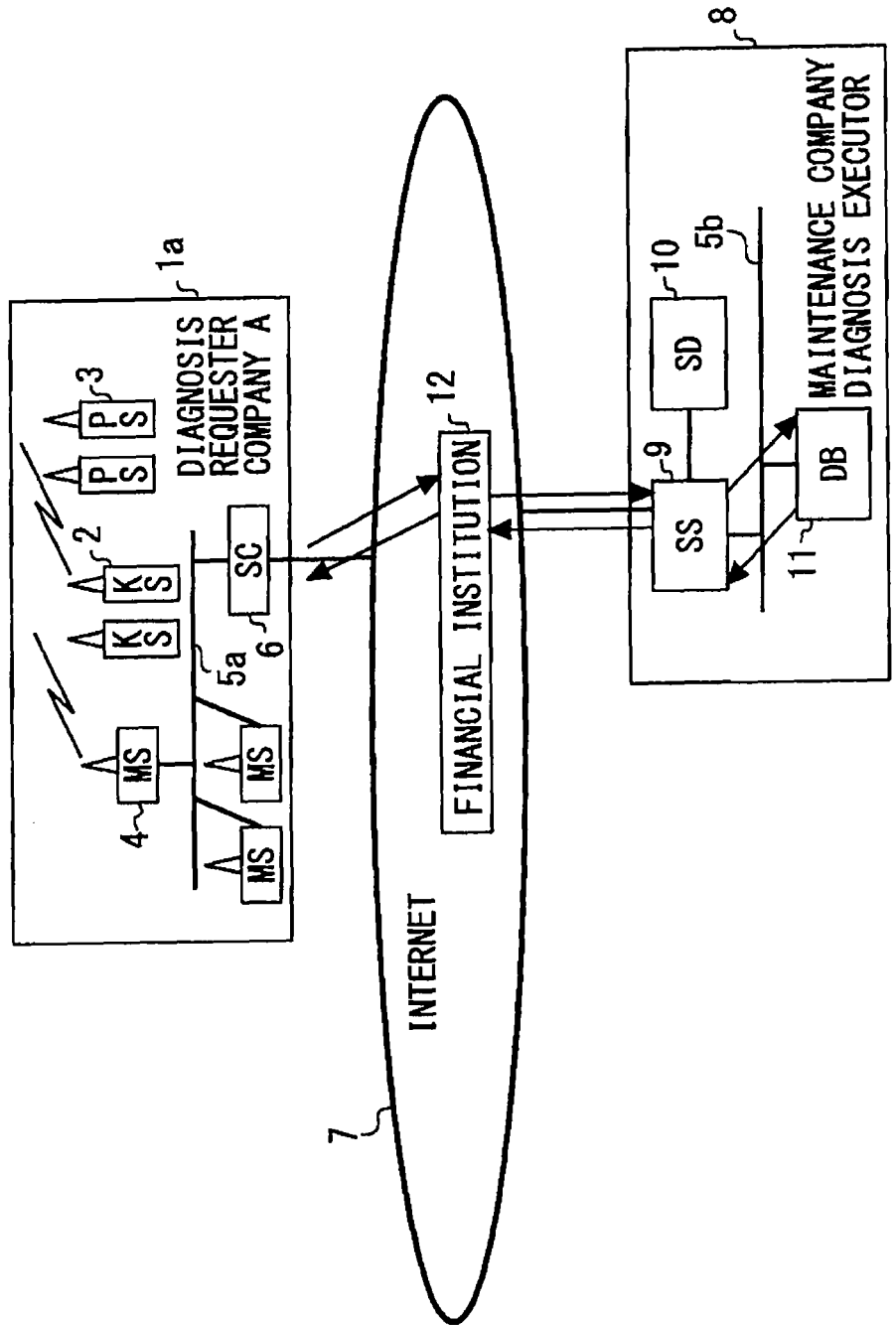
FIG. 3 is a diagram to explain the general configuration of an automatic remote monitoring and diagnosis system related to Embodiment 3 and Embodiment 4 of the present invention.

FIG. 3 is related to Embodiment 3 of the present invention and is a diagram explaining the general configuration of an automatic remote monitoring and diagnosis system.

Embodiment 3 described here is obtained by paying attention, in particular, to carrying out an environmental diagnosis, preparing an environmental diagnosis report, and presenting a remedy based on the environmental diagnosis report as well as identifying the cause when an unexpected and sporadic problem occurs and presenting a remedy for the problems in question in Embodiment 1 described above.

That is, in the automatic remote monitoring and diagnosis system of the present application invention, as described in Embodiment 1, the diagnostic server 9 can carry out an environmental diagnosis of the electronic control devices and the like of a diagnosis requester based on the measurement data sent from the diagnostic client 6 via the Internet 7. Incidentally, in this environmental diagnosis, threshold values set in the diagnostic server 9, an inference engine mounted in the knowledge database 11 and the like are used as described above.

As described also in Embodiment 2, measurement data from the start of data measurement up to the present time are continuously retained in the diagnostic server 9. For this reason, by using the retained data, it is possible to carry out an environmental diagnosis of the electronic control devices and the like in any period at any timing and to prepare an environmental diagnosis report by summarizing results of the environmental diagnosis in a prescribed report format. On this occasion, the execution period and timing of the environmental diagnosis can be agreed upon beforehand between Company A 1a, which is the diagnosis requester, and the maintenance company 8, which is the diagnosis executer.

Alternatively, the configuration may be such that it is ensured that the diagnosis requester (Company A 1a) can request an environmental diagnosis from the diagnostic server 9 at any timing by operating the diagnostic client 6. Upon receipt of this request for an environmental diagnosis, the diagnostic server 9 carries out an environmental diagnosis using the measurement data retained in the data retaining device 10 and prepares an environmental diagnosis report from results of the environmental diagnosis. The diagnostic server 9 sends this environmental diagnosis report to the diagnostic client 6 via the Internet 7. And the diagnostic client 6 indicates the environmental diagnosis report sent from the diagnostic server 9 using an output device.

As described in Embodiment 1 above, the diagnostic server 9 can detect a trouble in the electronic control devices and the like of the diagnosis requester based on the measurement data sent from the diagnostic client 6 via the Internet 7. And the diagnostic server 9 can estimate or identify the cause of this trouble and can determine a remedy for this trouble. Incidentally, in the detection of the trouble, estimation and the like of the cause, threshold values set in the diagnostic server 9, trouble correlation data mounted in the knowledge database 11 and the like are used as described above.

And the remedy in the case where problems of a trouble in the object of monitoring and the like are recognized can be instantaneously presented to the diagnosis requester (Company A 1a) via the Internet 7. Furthermore, the configuration may be such that even in the case where a service contract including the presentation of a remedy has not been concluded beforehand between the requester and the executor, the diagnosis requester can request the presentation of a remedy at any timing by operating the diagnostic client 6.

Moreover, as described in Embodiment 1 above, the diagnostic server 9 obtains, in real time, measurement data by the environmental sensors 2 and the physical sensors 3 in the electronic control devices and the like of the diagnosis requester. Therefore, in the case where a problem occurred in the electronic control devices and the like unexpectedly or sporadically, the diagnostic server 9 can instantaneously carry out a data analysis at the occurrence of the problem, identify the cause, and present the result to the diagnostic client 6 of the diagnosis requester via the Internet 7.

And even for a requestor who has not concluded a service contract beforehand with the executor for identifying the cause of such an unexpected or sporadic problem and presenting a remedy, the configuration may be such that the diagnosis requester can request such a service being provided at any timing by operating the diagnostic client 6. In this case, it is necessary only that the diagnostic server 9 constantly accumulate the result of the environmental diagnosis, the result of identifying the cause, and the remedy in the data retaining device 10 and the like.

Incidentally, in this embodiment, the above-described request for services from the requester side and the services provided by the executor side may be performed through a financial institution 12 connected to the Internet 7. In this manner, it is possible to ensure the secrecy and security of information by using on-line authentication services and the like by credit cards of the financial institution 12. Furthermore, automatic settlement of compensation payment becomes possible by an account-to-account transfer and the like in the financial institution 12 at a later date.

Other components are the same as in Embodiment 1, and detailed descriptions thereof are omitted.

In the automatic remote monitoring and diagnosis system configured as described above, a diagnosis requester can obtain results of an environmental diagnosis in real time when necessary. Furthermore, the diagnosis requester can obtain a remedy for the equipment of the diagnosis requester and can instantaneously obtain a remedy when a problem occurs.

Embodiment 4

Embodiment 4 described here is obtained by paying attention, in particular, to carrying out a deterioration diagnosis, preparing a deterioration diagnosis report, and presenting a remedy based on the deterioration diagnosis report in Embodiment 1 described above. Incidentally, because the configuration of the automatic remote monitoring and diagnosis system in this embodiment is the same as in Embodiment 3, with the exception of points which will be described below, the description will be given with the aid of FIG. 3.

That is, in the automatic remote monitoring and diagnosis system of the present application invention, as described in Embodiment 2 above, measurement data from the start of data measurement up to the present time are continuously retained in the data retaining device 10. Therefore, it is possible to easily observe time-series changes in measurement data. And by observing time-series changes in measurement data, it is possible to carry out a deterioration diagnosis of the electronic control devices and the like to be monitored. And furthermore, it is possible to prepare a deterioration diagnosis report by summarizing results of the deterioration diagnosis in a prescribed report format. Specifically, for example, it is possible to make a judgment on the deterioration of a control power supply by checking time-series changes in spike noise based on voltage measurement data among the measurement data by the physical sensors 3.

Furthermore, the configuration may be such that it is ensured that the diagnosis requester (Company A 1a) requests a deterioration diagnosis from the diagnostic server 9 at any timing by operating the diagnostic client 6. Upon receipt of this request for the deterioration diagnosis, the diagnostic server 9 carries out a deterioration diagnosis using the measurement data retained in the data retaining device 10 and prepares a deterioration diagnosis report from the results of the deterioration diagnosis. The diagnostic server 9 sends this deterioration diagnosis report to the diagnostic client 6 via the Internet 7. And the diagnostic client 6 indicates the deterioration diagnosis report sent from the diagnostic server 9 using an output device.

Besides, based on a deterioration diagnosis of the electronic control devices and the like by the diagnostic server 9 as described above, a remedy in the case where a problem is recognized can be instantaneously presented to the diagnosis requester via the Internet 7. Furthermore, the configuration may be such that even in the case where a service contract including the presentation of a remedy has not been concluded beforehand between the requester and the executor, the diagnosis requester can request the presentation of a remedy at any timing by operating the diagnostic client 6.

Incidentally, in the same manner as in Embodiment 3 above, also in this embodiment, requesting of a deterioration diagnosis and sending the results of the deterioration diagnosis may be performed through a financial institution 12 connected to the Internet 7. In this manner, it is possible to ensure the secrecy and security of information by using on-line authentication services and the like by credit cards of the financial institution 12. Furthermore, automatic settlement of compensation payment becomes possible by an account-to-account transfer and the like in the financial institution 12 at a later date.

Furthermore, due to the configuration described above, it is possible to accumulate the past measurement data, results of the environmental diagnosis, and results of the deterioration diagnosis in the data retaining device 10 of the diagnostic server 9 for each piece of the equipment of the diagnosis requester. And it is possible to study and determine the contents to be carried out during periodical inspection of the equipment in question based on these data, that is, to carry out equipment inspection consultation. Specifically, if progress in the deterioration of a control power supply is recognized, it is possible to make a suggestion about the replacement of the power supply. If an increase in the noise portion of an AC power supply is recognized, it is possible to make a suggestion about the addition of a filter and furthermore if the humidity tends to drop, it is possible to make a suggestion about the installation of a humidifier.

In the automatic remote monitoring and diagnosis system configured as described above, a diagnosis requester can obtain results of a deterioration diagnosis in real time when necessary. Furthermore, the diagnosis requester can obtain a remedy in real time in the case of deterioration of the equipment of the diagnosis requester. In addition, the automatic remote monitoring and diagnosis system contributes also to an improvement in the life of the electronic control devices and the like.

Embodiment 5

Embodiment 5 described here ensures that in Embodiment 1 described above, an abnormality can be detected in the equipment on the diagnosis requester side which constitutes this system, such as sensors, wireless servers, and diagnostic clients.

That is, in the automatic remote monitoring and diagnosis system of the present application invention, as described in Embodiment 2 above, measurement data is continuously sent at prescribed time intervals from the diagnostic client 6 to the diagnostic server 9. Therefore, the diagnostic server 9 monitors whether or not there is a lack of the measurement data and in the case where a lack of the measurement data from the diagnostic client 6 has been detected, it is possible to judge that some abnormality has occurred in the equipment on the side of the object of diagnosis as viewed from the diagnostic client 6 of the diagnosis requester, specifically, the environmental sensors 2, the physical sensors 3, the wireless server 4, the first LAN 5a as well as the diagnostic client 6 and the like.

In the case where data having values not conceivable as measured value has been sent, by using the knowledge database 11, the diagnostic server 9 can judge that this is an abnormality in the environmental sensors 2 and the physical sensors 3. And the configuration may be such that in the case where an abnormality as described above has been detected, the diagnostic server 9 sends a signal to that effect to the diagnostic client 6 via the Internet 7 and an alarm is issued from the diagnostic client 6 which has received this signal.

Incidentally, such a function of abnormality detection can be provided not only in the diagnostic server 9, but also in the wireless server 4 and the diagnostic client 6 on the side of the diagnosis requester. That is, the environmental sensors 2 and the physical sensors 3 and the wireless server 4 as well as the wireless server 4 and the diagnostic client 6 are each continuously performing communication of measurement data at given time intervals. Therefore, in the case where in the wireless server 4 and the diagnostic client 6, communication with the respective communication counterparts has been cut off, it is possible to detect the occurrence of an abnormality, such as a trouble in the equipment of the side of the communication counterpart in question. For example, in the case where an abnormality is detected by the diagnostic client 6, it is possible to detect an abnormality in the environmental sensors 2, the physical sensors 3, the wireless server 4 and the like.

In this case, the wireless server 4 and the diagnostic client 6 which have detected the occurrence of an abnormality in the equipment of the communication counterpart may issue an alarm to that effect at that time or may provide information to that effect to their host equipment (the diagnostic client 6 and the diagnostic server 9 in the case of the wireless server 4, the diagnostic server 9 in the case of the diagnostic client 6).

In the automatic remote monitoring and diagnosis system configured as described above, a diagnosis executor can provide a measurement system having very high reliability to an environmental diagnosis requester.

Embodiment 6

Figure 4:
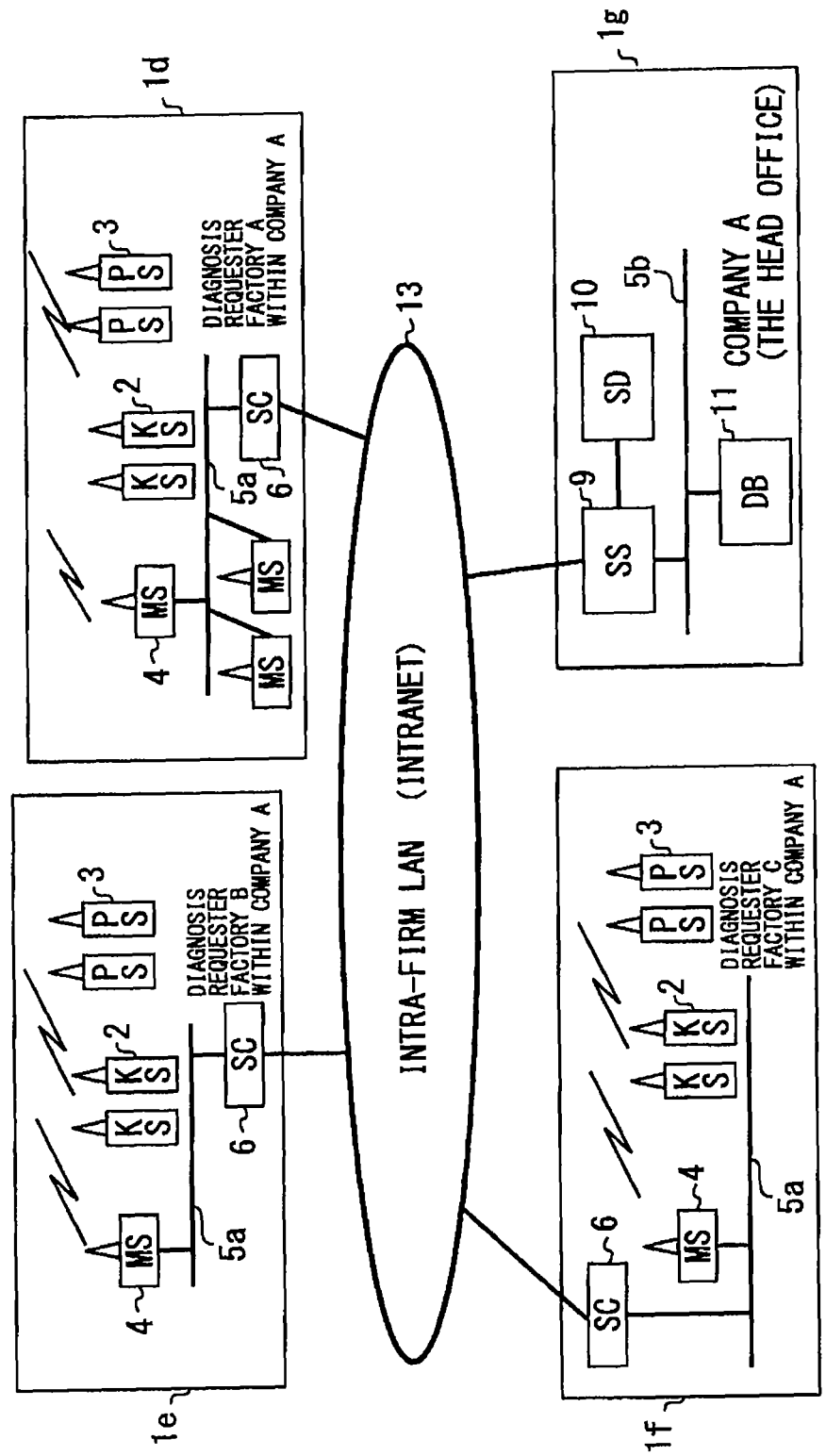
FIG. 4 is a diagram to explain the general configuration of an automatic remote monitoring and diagnosis system related to Embodiment 6 of the present invention.
Figure 5:
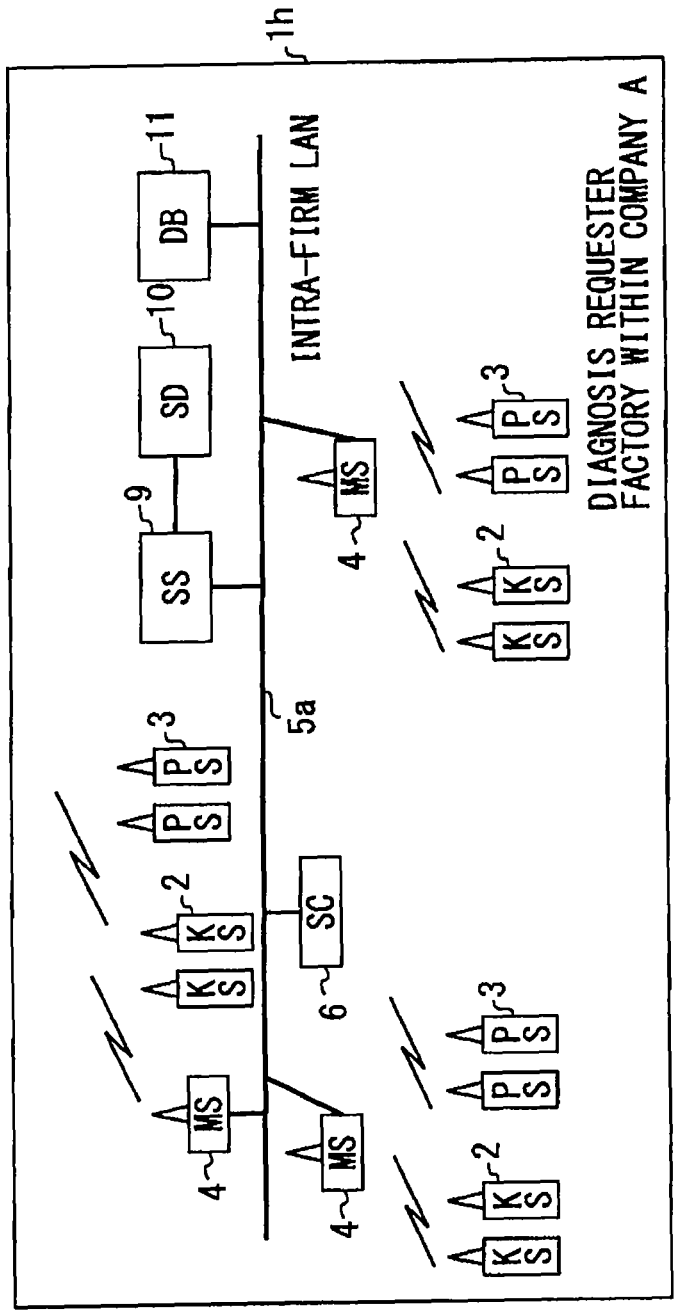
FIG. 5 is a diagram to explain another general configuration of an automatic remote monitoring and diagnosis system related to Embodiment 6 of the present invention.

FIGS. 4 and 5 relate to Embodiment 6 of the present invention; FIG. 4 being a diagram to explain the general configuration of an automatic remote monitoring and diagnosis system and FIG. 5 being a diagram to explain another general configuration of the automatic remote monitoring and diagnosis system in this embodiment.

Embodiment 1 described above has a configuration in which measurement data of a plurality of different diagnosis requesters is collectively managed and collectively diagnosed by a diagnostic server of a diagnosis executor, such as a manufacturer and a maintenance service company. For this reason, the Internet is used for the communication between a plurality of diagnosis requesters and a diagnosis executor.

In contrast to this, Embodiment 6 described here is an example in which the communication networks between pieces of equipment are changed according to the situation, state and the like of an object of monitoring and a diagnosis requester, with the configuration of the equipment constituting this remote monitoring system, in other words, the configuration of nodes of the network kept unchanged from Embodiment 1.

FIG. 4 shows an example of a configuration in which Company A, which is a diagnosis requester, collectively performs data management and diagnosis in the company's head office, with the electronic control devices and the like present in a plurality of the company's premises (factories) as the object of monitoring. In this case, the electronic control devices and the like as the objects of monitoring, are present in Factory A 1*d* within Company A, in Factory B 1*e* within Company A, and in Factory C 1*f* within Company A, respectively. And environmental sensors 2 and physical sensors 3 are installed for each of the electronic control devices and the like of each factory. Measurement data is sent by wireless communication from these environmental sensors 2 and physical sensors 3 to a wireless server 4.

The communication network which communicatably connects the wireless server 4 and the diagnostic client 6 is the first LAN 5*a* laid within each factory. Factory A 1*d* within Company A, Factory B 1*e* within Company A, and Factory C 1*f* within Company A and Company A (the head office) 1*g* are connected by an intranet 13, which is an intra-firm LAN which is communicatably provided only within Company A. Therefore, the communication network which communicatably connects each diagnostic client 6 installed in each factory within Company A and the diagnostic server 9 installed in Company A (the head office) 1*g* is this intranet 13. And the communication network which communicatably connects the diagnostic server 9 and the knowledge database 11 within Company A (the head office) 1*g* is the second LAN 5*b*.

Incidentally, other components are the same as in Embodiment 1 and the like.

FIG. 5 shows an example of a configuration in which the electronic control devices and the like present in a factory 1*h* within Company A, which is a certain premise (factory) of Company A, which is the diagnosis requester, are to be monitored, and also data management and diagnosis are completed in the factory 1*h* within Company A in the same premise. In this case, the electronic control devices and the like in the factory 1*h* within Company A are to be monitored, and the environmental sensors 2, the physical sensors 3, the wireless server 4, and the diagnostic client 6 are installed in the factory 1*h* within Company A. And the diagnostic server 9, the data retaining device 10, and the knowledge database 11 are also installed in the factory 1*h* within Company A.

Measurement data is sent by wireless communication from the environmental sensors 2 and the physical sensors 3 to the wireless server 4. The first LAN 5*a* is laid in the factory 1*h* within Company A. The communication network which communicatably connects the wireless server 4 and the diagnostic client 6 is this first LAN 5*a*. The communication network which communicatably connects the diagnostic client 6 and the diagnostic server 9 is also the first LAN 5*a*. Furthermore, the communication network which communicatably connects the diagnostic server 9 and the knowledge database 11 is also the first LAN 5*a*. That is, the wireless server 4, the diagnostic client 6, the diagnostic server 9, and the date retaining device 10 are all connected by the same communication network, which is the first LAN 5*a*.

Incidentally, other components are the same as in Embodiment 1 and the like.

Without changing the basic configuration of the equipment constituting the system, such as the sensors, clients, and servers, the communication networks communicatably connecting between these pieces of equipment are appropriately changed, whereby it is possible to flexibly build the automatic remote monitoring and diagnosis system configured as described above according to the situation, state and the like of an object of monitoring and a diagnosis requester.

That is, in the case where a diagnosis requester does not want the measurement data related to the diagnosis requester's object of monitoring to be disclosed to others, it is possible to build a closed system only for the diagnosis requester in question. And on this occasion, it is possible to flexibly build the system according to the position where the objects of monitoring of the diagnosis requester in question are present and the number of the objects of monitoring.

FIG. 4 shows the case of a diagnosis requester whose factories, having the electronic control devices and the like to be monitored, are scattered in various sites. This case produces the advantage that it is possible to measure and diagnose environmental data in the closed system within the company, and environmental measurement data does not leak to outside the company because the sites where the objects of monitoring are present are connected by the company's intranet 13. In addition, measurement data of the company can be collectively managed at the head office.

FIG. 5 shows the case of a diagnosis requester whose factory, having the electronic control devices and the like to be monitored, is only one place. In this case, all pieces of the equipment constituting the system are arranged only in one place of the factory in question. Therefore, it is possible to measure and diagnose environmental data in the closed system within the factory in question, and measurement data within the factory in question does not leak to outside the factory in question.

On the other hand, in a configuration as shown in FIG. 1 of Embodiment 1, a diagnosis executor who has been requested to perform a diagnosis can automatically and easily collect measurement data of the electronic control devices and the like in all sites where the diagnosis is carried out, without requiring manpower. For this reason, it is possible to reduce the burden of management and the burden of diagnosis work for the diagnosis executor. Moreover, because it is possible to use many measurement data, diagnosis results and the like, improvements in the inference engine, the diagnosis algorithm, and the trouble correlation data can be expected. That is, this configuration contributes to a progress in the knowledge database, as a result of which the capacity identifying the cause can be improved, providing advantages to both a diagnosis requester and a diagnosis executor.

INDUSTRIAL APPLICABILITY

The present invention can be used in an automatic remote monitoring and diagnosis system which monitors the state and the like of, for example, electronic control devices for plant equipment or equipment of plants and the like and automatically diagnoses the existence or nonexistence of an abnormality therein.

DESCRIPTION OF SYMBOLS

1a Company A
1b Company B
1c Company C
1d Factory A within Company A
1e Factory B within Company A
1f Factory C within Company A
1g Company A (the head office)
1h factory within Company A
2 environmental sensors
3 physical sensors
4 wireless server
5a first LAN
5b second LAN
6 diagnostic client
7 Internet
8 maintenance company
9 diagnostic server
10 data retaining device
11 knowledge database
12 financial institution
13 intranet

The invention claimed is:

1. An automatic remote monitoring and diagnosis system which diagnoses electronic control devices or equipment, comprising:
    an environmental sensor which measures environmental data related to an installation environment of the electronic control devices or equipment with a prescribed measurement cycle and sends measurement data by wireless communication;
    a plurality of physical sensors which measures physical data related to the electronic control devices or equipment and sends measurement data by wireless communication;
    a wireless server which collects the measurement data sent from the environmental sensor and the plurality of physical sensors by wireless communication and sends the collected measurement data at prescribed time intervals;
    a diagnostic client which is communicably connected to the wireless server by a first communication network, collects the measurement data sent from the wireless server via the first communication network, and sends the collected measurement data at prescribed time intervals;
    a diagnostic server which is communicably connected to the diagnostic client by a second communication network, receives the measurement data sent from the diagnostic client via the second communication network, and carries out a diagnosis of the electronic control devices or equipment based on the received measurement data;
    a data retaining device which retains the measurement data received by the diagnostic server; and
    a knowledge database which stores information necessary when the diagnostic server carries out the diagnosis, wherein
    the diagnostic server sends results of the diagnosis to the diagnostic client via the second communication network and in a case where as a result of the diagnosis there is a problem in the electronic control devices or equipment, the diagnostic server determines a remedy for the problem and sends the remedy to the diagnostic client via the second communication network,
    the plurality of physical sensors includes:
        a first sensor group including a sensor configured to measure voltage and current with a first measurement cycle of an order of 10 milliseconds; and
        a second sensor group including a sensor configured to measure electromagnetic wave and static electricity with a second measurement cycle of an order of 10 nanoseconds.

2. The automatic remote monitoring and diagnosis system according to claim 1, wherein the environmental sensor, the plurality of physical sensors, the wireless server, and the diagnostic client are installed in a factory of a diagnosis requester who requests a diagnosis of the electronic control devices or equipment,
    wherein the diagnostic server, the data retaining device, and the knowledge database are installed on a side of a diagnosis executor who is requested to perform the diagnosis and carries out the diagnosis,
    wherein the first communication network is a local area network (LAN) laid in the factory of the diagnosis requester, and
    wherein the second communication network uses the Internet.

3. The automatic remote monitoring and diagnosis system according to claim 2, wherein the diagnostic server brings the measurement data retained in the data retaining device together for a prescribed period, outputs the measurement data as an electronic file, and sends the electronic file to the diagnostic client via the second communication network.

4. The automatic remote monitoring and diagnosis system according to claim 2, wherein the diagnostic server diagnoses deterioration of the electronic control devices or equipment by comparing the measurement data sent from the diagnostic client with past measurement data retained in the data retaining device, summarizes diagnosis results of deterioration in a prescribed report format, sends the diagnosis results of deterioration summarized in report format to the diagnostic client via the second communication network, determines, in a case where there is a problem in the electronic control devices or equipment as a result of deterioration, a remedy for the problem, and sends the remedy to the diagnostic client via the second communication network.

5. The automatic remote monitoring and diagnosis system according to claim 2, wherein based on the measurement data sent from the diagnostic client, the diagnostic server detects whether an abnormality has occurred at least in any of the environmental sensor, the plurality of physical sensors, the wireless server, and the diagnostic client, and sends, in a case where the occurrence of the abnormality has been detected, a signal to that effect to the diagnostic client via the second communication network.

6. The automatic remote monitoring and diagnosis system according to claim 2, wherein based on the measurement data sent from the wireless server, the diagnostic server detects whether an abnormality has occurred at least in any of the environmental sensor, the plurality of physical sensors, and the wireless server, and issues, in a case where the occurrence of the abnormality has been detected, an alarm to that effect.

7. The automatic remote monitoring and diagnosis system according to claim 1, wherein the environmental sensor, the plurality of physical sensors, the wireless server, and the diagnostic client are installed in a factory of a diagnosis requester who requests a diagnosis of the electronic control devices or equipment,
wherein the diagnostic server, the data retaining device, and the knowledge database are arranged at a head office of the diagnosis requester,
wherein the first communication network is a local area network (LAN) laid in the factory of the diagnosis requester, and
wherein the second communication network is an intranet which communicably connects the factory of the diagnosis requester and the head office.

8. The automatic remote monitoring and diagnosis system according to claim 7, wherein the diagnostic server brings the measurement data retained in the data retaining device together for a prescribed period, outputs the measurement data as an electronic file, and sends the electronic file to the diagnostic client via the second communication network.

9. The automatic remote monitoring and diagnosis system according to claim 7, wherein the diagnostic server diagnoses deterioration of the electronic control devices or equipment by comparing the measurement data sent from the diagnostic client with past measurement data retained in the data retaining device, summarizes diagnosis results of deterioration in a prescribed report format, sends the diagnosis results of deterioration summarized in report format to the diagnostic client via the second communication network, determines, in a case where there is a problem in the electronic control devices or equipment as a result of deterioration, a remedy for the problem, and sends the remedy to the diagnostic client via the second communication network.

10. The automatic remote monitoring and diagnosis system according to claim 7, wherein based on the measurement data sent from the diagnostic client, the diagnostic server detects whether abnormality has occurred at least in any of the environmental sensor, the plurality of physical sensors, the wireless server, and the diagnostic client, and sends, in a case where the occurrence of the abnormality has been detected, a signal to that effect to the diagnostic client via the second communication network.

11. The automatic remote monitoring and diagnosis system according to claim 7, wherein based on the measurement data sent from the wireless server, the diagnostic server detects whether an abnormality has occurred at least in any of the environmental sensor, the plurality of physical sensors, and the wireless server, and issues, in a case where the occurrence of the abnormality has been detected, an alarm to that effect.

12. The automatic remote monitoring and diagnosis system according to claim 1, wherein the environmental sensor, the plurality of physical sensors, the wireless server, and the diagnostic client as well as the diagnostic server, the data retaining device, and the knowledge database are arranged in a factory of a diagnosis requester who requests a diagnosis of the electronic control devices or equipment, and
wherein the first communication network and the second communication network are both a local area network (LAN) laid in the factory of the diagnosis requester.

13. The automatic remote monitoring and diagnosis system according to claim 12, wherein the diagnostic server brings the measurement data retained in the data retaining device together for a prescribed period, outputs the measurement data as an electronic file, and sends the electronic file to the diagnostic client via the second communication network.

14. The automatic remote monitoring and diagnosis system according to claim 12, wherein the diagnostic server diagnoses deterioration of the electronic control devices or equipment by comparing the measurement data sent from the diagnostic client with past measurement data retained in the data retaining device, summarizes diagnosis results of deterioration in a prescribed report format, sends the diagnosis results of deterioration summarized in report format to the diagnostic client via the second communication network, determines, in a case where there is a problem in the electronic control devices or equipment as a result of deterioration, a remedy for the problem, and sends the remedy to the diagnostic client via the second communication network.

15. The automatic remote monitoring and diagnosis system according to claim 12, wherein based on the measurement data sent from the diagnostic client, the diagnostic server detects whether an abnormality has occurred at least in any of the environmental sensor, the plurality of physical sensors, the wireless server, and the diagnostic client, and sends, in a case where the occurrence of the abnormality has been detected, a signal to that effect to the diagnostic client via the second communication network.

16. The automatic remote monitoring and diagnosis system according to claim 12, wherein based on the measurement data sent from the wireless server, the diagnostic server detects whether an abnormality has occurred at least in any of the environmental sensor, the plurality of physical sensors, and the wireless server, and issues, in a case where the occurrence of the abnormality has been detected, an alarm to that effect.

17. The automatic remote monitoring and diagnosis system according to claim 1, wherein the diagnostic server brings the measurement data retained in the data retaining device together for a prescribed period, outputs the measurement data as an electronic file, and sends the electronic file to the diagnostic client via the second communication network.

18. The automatic remote monitoring and diagnosis system according to claim 1, wherein the diagnostic server diagnoses deterioration of the electronic control devices or equipment by comparing the measurement data sent from the diagnostic client with past measurement data retained in the data retaining device, summarizes diagnosis results of deterioration in a prescribed report format, sends the diagnosis results of deterioration summarized in report format to the diagnostic client via the second communication network, determines, in a case where there is a problem in the electronic control devices or equipment as a result of deterioration, a remedy for the problem, and sends the remedy to the diagnostic client via the second communication network.

19. The automatic remote monitoring and diagnosis system according to claim 1, wherein based on the measurement data sent from the diagnostic client, the diagnostic server detects whether an abnormality has occurred at least in any of the environmental sensor, the plurality of physical sensors, the wireless server, and the diagnostic client, and sends, in a case where the occurrence of the abnormality has been detected, a signal to that effect to the diagnostic client via the second communication network.

20. The automatic remote monitoring and diagnosis system according to claim 1, wherein based on the measurement data sent from the wireless server, the diagnostic server detects whether an abnormality has occurred at least in any of the environmental sensor, the plurality of physical sensors, and the wireless server, and issues, in a case where the occurrence of the abnormality has been detected, an alarm to that effect.

* * * * *